US007538765B2

(12) United States Patent
Seiler et al.

(10) Patent No.: US 7,538,765 B2
(45) Date of Patent: May 26, 2009

(54) METHOD AND APPARATUS FOR GENERATING HIERARCHICAL DEPTH CULLING CHARACTERISTICS

(75) Inventors: Larry D. Seiler, Boylston, MA (US); Laurent Lefebvre, Lachenaie (CA); Stephen L. Morein, Cambridge, MA (US)

(73) Assignee: ATI International SRL, Christchurch (BB)

( * ) Notice: Subject to any disclaimer, the term of this patent is extended or adjusted under 35 U.S.C. 154(b) by 538 days.

(21) Appl. No.: 10/914,949

(22) Filed: Aug. 10, 2004

(65) Prior Publication Data

US 2006/0033735 A1    Feb. 16, 2006

(51) Int. Cl.
*G06T 15/40* (2006.01)
(52) U.S. Cl. .................. 345/421; 345/422; 345/426; 345/533; 345/611; 345/597; 345/598
(58) Field of Classification Search .......... 345/421, 345/422, 426, 533, 611, 597, 598
See application file for complete search history.

(56) References Cited

U.S. PATENT DOCUMENTS

| 5,579,455 | A | 11/1996 | Greene et al. |
| 5,977,980 | A | 11/1999 | Aleksic |
| 6,169,553 | B1 | 1/2001 | Fuller et al. |
| 6,188,394 | B1 | 2/2001 | Morein et al. |
| 6,195,737 | B1 | 2/2001 | Hollister et al. |
| 6,407,741 | B1 | 6/2002 | Morein et al. |
| 6,457,034 | B1 | 9/2002 | Morein et al. |
| 6,492,991 | B1 | 12/2002 | Morein et al. |
| 6,525,726 | B1 | 2/2003 | Xie et al. |
| 6,707,462 | B1 | 3/2004 | Peercy et al. |
| 6,894,689 | B1 * | 5/2005 | Greene et al. ............... 345/422 |
| 7,030,878 | B2 * | 4/2006 | Xu et al. ................... 345/422 |
| 7,248,261 | B1 | 7/2007 | Hakura |
| 2003/0038819 | A1 * | 2/2003 | Lewis ..................... 345/611 |
| 2003/0043148 | A1 * | 3/2003 | Mei et al. ................. 345/421 |
| 2003/0151606 | A1 | 8/2003 | Morein et al. |
| 2004/0169651 | A1 | 9/2004 | Everitt et al. |

(Continued)

OTHER PUBLICATIONS

International Search Report for International Application No. PCT/US2005/006744; European Patent Office; dated Jun. 21, 2005.

(Continued)

*Primary Examiner*—Kimbinh T. Nguyen
(74) *Attorney, Agent, or Firm*—Vedder Price P.C.

(57) ABSTRACT

A method and apparatus for generating hierarchical depth culling characteristics includes determining a first minimum depth value and a first maximum depth value for a first graphical element. The graphical element may be a primitive. The first minimum depth value may be a minimum Z-plane depth of a pixel within the primitive and a first maximum depth value is a maximum Z-plane value for a pixel within the primitive. The method and apparatus further includes determining a second minimum depth value and a second maximum depth value for a second graphical element, which may be a tile. The method and apparatus further includes calculating an intersection depth range having an intersection minimum depth value and an intersection maximum depth value based on the intersection of the first minimum depth value and the first maximum depth value and the second minimum depth value and the second maximum depth value.

20 Claims, 4 Drawing Sheets

U.S. PATENT DOCUMENTS

2005/0134588 A1\*  6/2005  Aila et al. ............... 345/426
2005/0195187 A1    9/2005  Seiler
2006/0033743 A1    2/2006  Morein
2006/0114261 A1\*  6/2006  Morphet ................. 345/553

OTHER PUBLICATIONS

Per-Fragment Operations and the Framebuffer; pp. 141-148; Version 1.2.1; Apr. 1, 1999.

Greene, Ned; Hierarchical Polygon Tiling with Coverage Masks; Computer Graphics Proceedings; Aug. 4, 1996; pp. 65-74.

Chen, Cheng-Hsien et al.; Two-Level Hierarchical Z-Buffer for 3D Graphics Hardware; National Chiao Tung University; 2002; pp. 253-256; Taiwan, ROC.

Blythe, David; Programming with OpenGL: Advanced Rendering, section 14: Using the Stencil Buffer; from www.opengl.org; Jun. 9, 2005.

\* cited by examiner

METHOD AND APPARATUS FOR GENERATING HIERARCHICAL DEPTH CULLING CHARACTERISTICS

FIELD OF THE INVENTION

The present invention relates generally to graphics rendering and more particularly to comparing pixel values prior to graphics rendering.

BACKGROUND OF THE INVENTION

Video graphics circuit generates pixel information for objects to be displayed on a computer screen, monitor or television. The source for the object may be a television broadcast, a cable television transmission, satellite transmission, computer generated program, a web-based image generator, or any other suitable image generation source. For computer screens, video graphics circuits partition each of the objects to be displayed into primitives. Each primitive is stored as a plurality of vertices of the corresponding display parameters for each vertex. Moreover, video graphics circuits also group a plurality of pixels into tiles, wherein a tile may be a specific number of pixels, for example, an 8×8 matrix of pixels.

For both the primitives and the tiles, each rendering element contains corresponding display parameters. Corresponding display parameters include, but are not limited to, color parameters, display or pixel locations and texture parameters. For corresponding display parameters, a video graphics circuit calculates slope and associated display parameters for each part within the primitive, based on the slopes and corresponding display parameters of other vertices.

When more than one object is to be displayed on a visual output, the objects may potentially overlap and the graphics processing may include unnecessary steps due to pixel information being calculated for an occluded object. When all of the pixel information for each primitive is calculated, a comparison is performed to determine which object is in the foreground. For the object that is in the background with respect to another object, the pixel information for the portion of the occluded object is discarded. As the calculation of such pixel information is unnecessary, it adversely affects the efficiency of the video graphics system. If only a small portion of an object is overlapped, the amount of unnecessary pixel information calculations are minimal, therefore there is a minimal adverse affect on the video graphics circuit efficiency. If, however, the object has a substantially overlapping portion, then the number of unnecessary calculations increases and the efficiency of the video graphics circuit are adversely affected. This may be compounded where several objects have overlapping portions and only one object will be visible in the foreground.

Another inefficiency arises when a stencil buffer is used during the render of an output image. One use of this is to do a first pass render which sets a stencil bit based on the 'projection' of a shadow, whereupon all pixels having a location within the stencil are potentially occluded. A second pass then renders the actual objects. Pixels that fall within the shadow are not visible and therefore may be unnecessarily rendered. Simply because a pixel has a common x,y coordinate, it must further be determined whether the pixel is visible in the z plane. Therefore, since the stencil may block out all pixels in the same x,y address, for example, such as hidden by the shadow, it is inefficient to render the pixels which are not visible due to the shadow and/or depth occlusion. A second algorithm used to render shadows, called 'Shadow Volumes' uses the Stencil Buffer instead to maintain a 'count' as the polygons that compose the boundaries of a shadow are rendered. If a pixel is in back of a shadow boundary, its count is incremented. If a pixel is in front of a shadow boundary its count is decremented. After all the shadow boundaries are rendered, only pixels that whose stencil (count) are 0 are truly in shadow. A final render pass is then done that 'lights' those pixels that are not in shadow. On this final pass, it is inefficient to process those pixels whose stencil value is 0, as they will ultimately not be written.

To overcome these inefficiencies, some video graphics circuits perform a hierarchical z buffering technique. Comparing multiple pixels having the same x, y location, wherein the z value of a pixel is compared to a stored z value, where the stored z value represents the outermost visible pixel, performs this operation, assuming that larger z values represent positions closer to the viewpoint. If the pixel to be rendered has a z value that is greater than the stored z value, the pixels may be rendered as these pixels may be visible. Also, the z value is updated to represent the value of the rendered pixel, as any other pixels of the same location having a smaller z value will be therein occluded by the rendered pixel.

Due to the amount of processing required to determine potential occlusion prior to rendering, hierarchical z determinations may be made on a tile having multiple pixels. Previous hierarchical z algorithms store a minimum z value per tile. Therefore, it can be determined if a pixel will fail a greater-than depth test but it cannot be determined if a pixel will fail or pass a less-than or equal-to depth comparison. Moreover, the tile having a minimum z value does not account for the stencil test. Therefore, the hierarchical z determination must be turned off from many operations, providing an inefficient graphics processing system.

Figure 1:
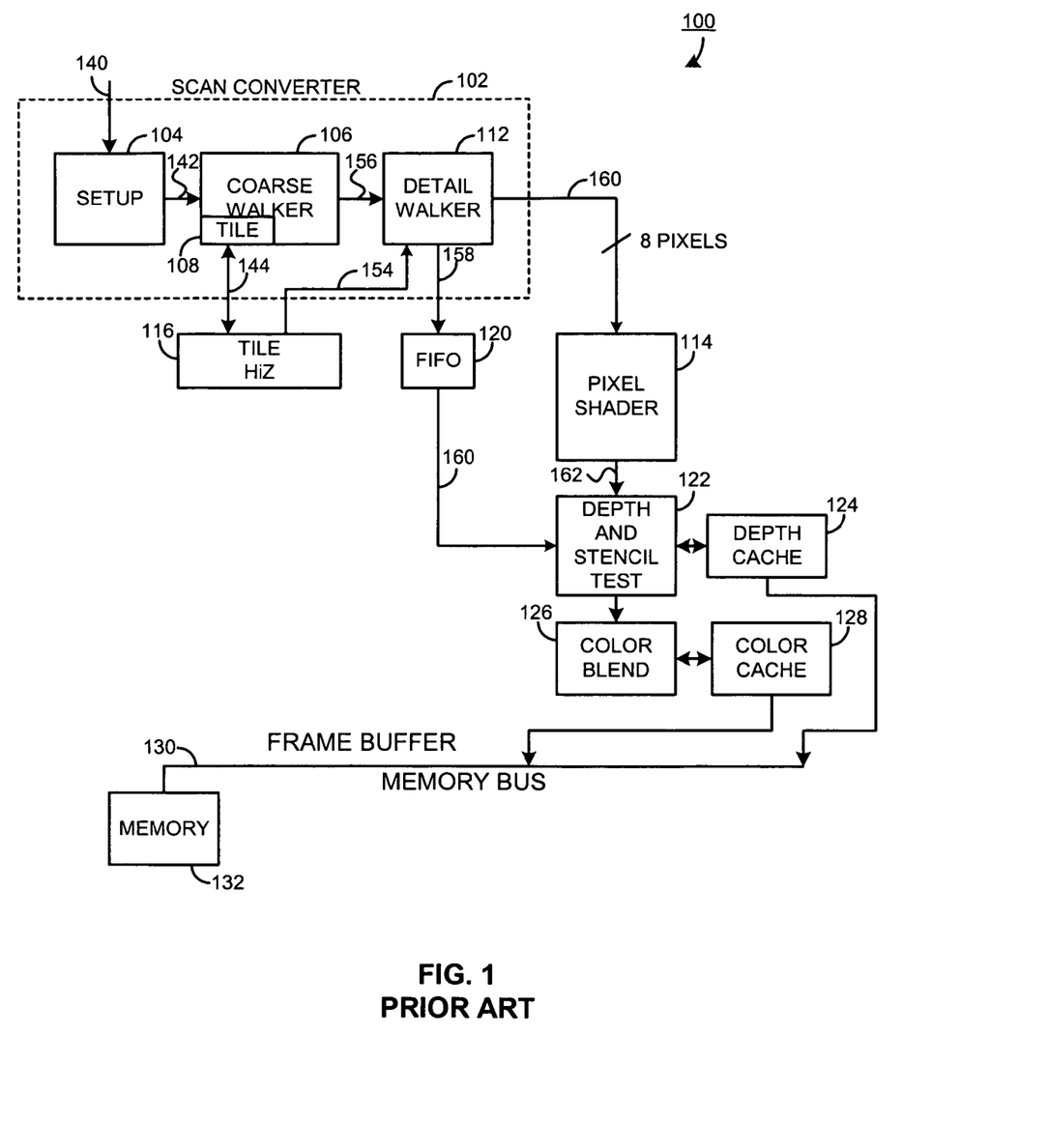
FIG. 1 illustrates a graphical representation of a prior art graphics processing system.

FIG. 1 illustrates a prior art graphics rendering system 100 having a scan converter 102 that includes a setup engine 104, a coarse walker 106 with a tile cache 108, and the scan converter 102 further including a detail walker 112. The processing system 100 further includes a tile hierarchical z engine 116 coupled to the coarse walker 106, a pixel shader 114 coupled to the scan converter 102 and a memory 120, such as a first-in-first-out (FIFO).

The pixel shader 114 and the memory 120 are coupled to a depth and stencil test processor 122, which is coupled to a depth cache 124. The depth and stencil test engine 122 is coupled to a color blend 126 which is coupled to a color cache 128, wherein the depth cache 124 and the color cache 128 are coupled to a frame buffer memory bus 130.

In accordance with prior art rendering techniques, the scan converter 102 receives plurality of graphics information 140 and generates a plurality of pixels 142 provided to the coarse walker 106. The coarse walker 106 generates a tile, such as a matrix of pixels and provides the tile 144 to the tile hierarchical z engine 116. A tile with depth value 148 is provided to the quad hierarchical z engine 118, wherein the engine 118 utilizes depth information to determine a quad depth value. The tile HiZ logic 116 compares a range of depth values associated with the tile to a depth value stored for that tile, typically representing the most extreme depth value in the tile. It then sends a mask 154 of pixels that are guaranteed to fail the HiZ test to the detail walker 112, which combines this with tile information 156 to produce a list of pixels and associated information 160, which is processed by pixel shader 114, and a corresponding list of pixels and associated information 120 that bypasses the pixel shader and is stored in FIFO memory 120.

The pixel shader 114 operates in accordance with known pixel shading technology and provides shaded pixel information 162 to the depth and stencil test engine 122, wherein the engine 122 also receives corresponding information 160 from the buffer 120. Thereupon, the prior art depth and stencil test performed by the engine 122 compares a z value per tile to determine only if a pixel will fail a greater-than depth test. The depth cache 124 stores z and stencil values for each pixel being rendered. Thereupon, once the depth and stencil tests are performed on a tile, the tile may then proceed to other processing elements such as the color blend 126 to the color cache 128 such that the tiles of pixels, which are to be rendered, are therein provided to the render backend 136 across the frame buffer memory bus 130 to the memory 132 using known data transfer means.

One problem with existing hierarchical depth tests is that the minimum value of a tile is compared to the z range of the entire primitive. The z range of a large primitive may be much larger than the z range of the primitive within a particular tile. Therefore, inefficiencies exist based on system settings of primitives with regard to settings for number of pixels within a tile. Furthermore, tiles may be too large to allow an accurate minimum z value and the number of bits used to store the minimum z value may be insufficient. These above-noted limitations may result in pixels passing the hierarchical z test and being shaded, wherein these pixels are then later culled by depth and stencil tests.

As such, there exists a need for a method and apparatus for a rendering system which combines hierarchical stencil buffering and a more effective means of hierarchical z buffering with a plurality of pixels disposed in tiles and primitives.

BRIEF DESCRIPTION OF THE DRAWINGS

The invention will be more readily understood with reference to the following drawings wherein.

DETAILED DESCRIPTION OF A PREFERRED EMBODIMENT

Generally, a method and apparatus for generating hierarchical depth culling characteristics includes determining a first minimum depth value and a first maximum depth value for a first graphical element. A first graphical element may be a primitive, such as a triangle, rectangle or any other graphical element having a plurality of vertices. The first minimum depth value may be the minimum z-plane depth of a pixel within the primitive, first graphical element and the first maximum depth value is a maximum z-plane value for a pixel within the primitive, first graphical element.

The method and apparatus further includes determining a second minimum depth value and a second maximum depth value for a second graphical element. The second graphical element may be a tile including a plurality of pixels. The second minimum depth value is a minimum z-plane value of the pixels within the second graphical element, the tile, and the second maximum depth value is a maximum z-plane value for the pixels within the second graphical element.

The method and apparatus further includes calculating an intersection depth range having an intersection minimum depth value and an intersection maximum depth value based on the intersection of the first minimum depth value and the first maximum depth value and the second minimum depth value and the second maximum depth value. Thereupon, the method and apparatus allows for a determined range of depth values based on the intersection of the minimum and maximum depth values for both the first graphical element, such as the primitive, and the second graphical element, such as the tile of pixels.

Figure 2:
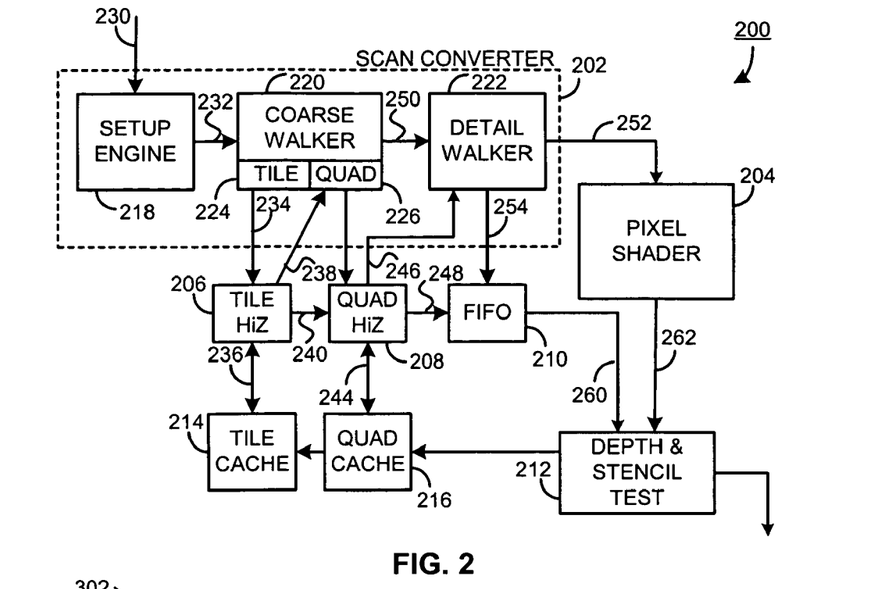
FIG. 2 illustrates a graphical representation of a graphics processing system, in accordance with one embodiment of the present invention.

FIG. 2 illustrates an apparatus for generating hierarchical depth culling characteristics in accordance with one embodiment of the present invention. The apparatus 200 includes a scan converter 202, a pixel shader 204, a tile hierarchical z engine 206 and a quad hierarchical z engine 208. The apparatus 200 further includes a memory 210, a depth and stencil test engine 212, a tile hierarchical z cache 214 and a quad hierarchical z cache 216. The scan converter 202 further includes a setup engine 218, a coarse walker 220 and a detail walker 222. The coarse walker 220 further includes a tile interface 224 and a quad interface 226.

The setup engine 218 receives pixel information 230 and thereupon generates a plurality of pixel information 232 including primitives and tiles. As described above, the primitive may be any shaped polygon having a plurality of vertices defining a perimeter region and a tile may be a matrix array of pixels included therein. The coarse walker 220 provides the tiles to a tile interface 224 such that the tiles 234 may be provided to the tile hierarchical z engine 206. The tile hierarchical z engine 206 may thereupon perform a depth comparison test of the tile relative to a maximum depth value 236 provided from the tile cache 214.

In one embodiment, the tile hierarchical z engine 206 is coupled to the quad hierarchical z engine 208 and also coupled to the quad interface 226 and the coarse walker 220. The quad is a defined section of the tiled matrix of pixels. For illustration purposes only, in one embodiment a tile may be an 8×8 matrix of pixels and a quad may be a 2×2 matrix of pixels within the tile. As recognized by one having ordinary skill in the art, the tile 234 may be any suitable matrix of pixels and the quad may be any suitable number of pixels relative to the tile 234.

The tile hierarchical z engine 206 provides depth comparison results 238 and 240 to the quad interface 226 and the quad hierarchical z engine 208 respectively. The quad hierarchical z engine 208 further receives a quad 242 from the coarse walker 220 such that a further level of depth comparison may be performed using information 240 from the tile hierarchical z engine 206 and stored depth information 244 from the quad cache 216.

The quad hierarchical z provides a depth output result 246 to the detail walker 222 of the scan converter 202 and quad depth information 248 to the memory 210. The detail walker 222 further receives pixel information 250. The detail walker 222 may thereupon provide the pixel information 252 to the pixel shader 204 such that the pixel shader 204 may apply a shading operation in accordance with known pixel shader techniques. Although, in the event that a determination is made that the tile relative to coarse walker data 250, including vertex depth information from an associated primitive generated by the coarse walker, that the primitive will be occluded, the detailed walker 222 may dispose of the pixel information and not provide the pixel information to the pixel shader 204 and provide updated z information 254 to the memory 210.

Figure 3:
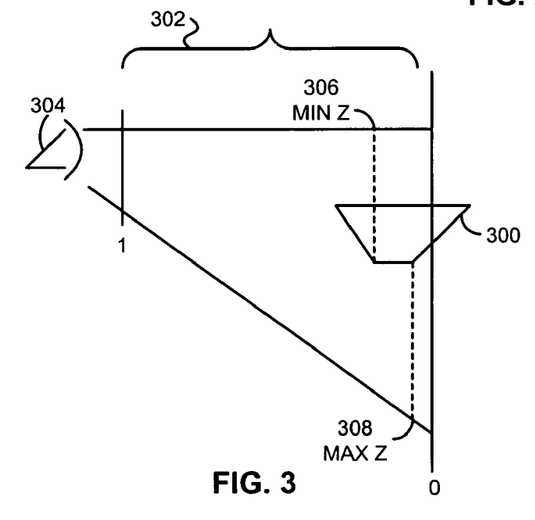
FIG. 3 illustrates a graphical representation of a graphics rendering element relative to depth and eye perspectives.

FIG. 3 illustrates a graphical representation of a rendering element 300 within a view frustrum 302 defined relative to an eye space 304. A source value is defined as a value that is computed in the pixel processing pipeline and a determination is made if the source value is less than a destination value. For a tile, a minimum z value 306 is required to determine if a pixel within the object is to be occluded and a maximum z value 308 is utilized to determine if a furthermost pixel is generated which may therein occlude other pixels. Based on the generation of the minimum z value, a determination can be made whether the rendering element 300 will have z values that will fail for the object based on the minimum z value.

Figure 4:
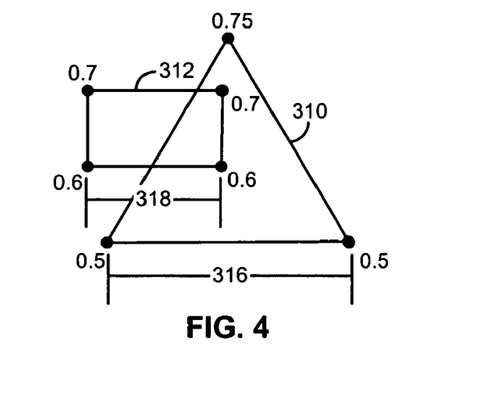
FIG. 4 illustrates a graphical representation of the overlay of a primitive and a tile.

Further with regard to FIG. 3, FIG. 4 illustrates a front view of a primitive 310, illustrated herein as a triangle, and a tile 312. While FIG. 3 illustrates the graphical element 300 from a depth perspective, FIG. 4 illustrates elements 310 and 312 from a front face perspective, typically disclosed as lying within an x,y plane. Although, illustrated in FIG. 4 are representative depth z values illustrated next to each of the plurality of vertices for the primitive 310 and the tile 312.

Figure 5:
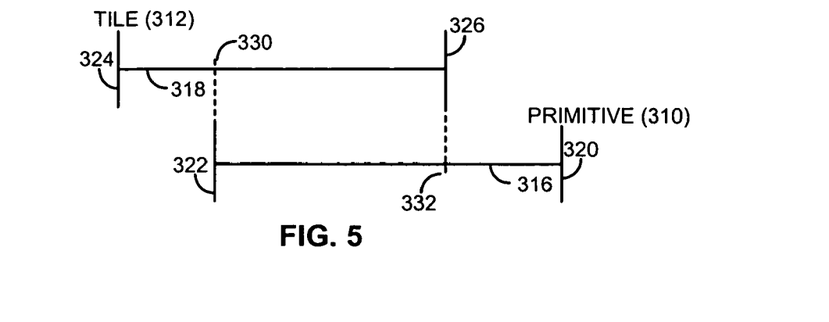
FIG. 5 illustrates a graphical representation of the depth based alignment for the elements illustrated in FIG. 4.

FIG. 4 illustrates relative orientation of the depth of these elements, a width 316 extending the base of the primitive 310 and a width 318 extending the base of the tile 312. In the present invention, the depth is computed both for the triangle and the tile relative to each other thereby defining a minimum and maximum range. As illustrated in FIG. 5, the first graphical element 310 includes a maximum depth value 320 and a minimum depth value 322. The second graphical element, the tile 312, includes a minimum depth value 324 and a maximum depth value 326. An intersection depth range is calculated based on the intersection of the minimum depth value 322 for the primitive 310 and the minimum depth value 324 for the tile 312. Moreover, an intersection maximum depth value 326 is generated by the intersection of the maximum depth value 320 for the primitive 310 and the maximum depth value 326 for the tile 312. More specifically, the intersection thereof provides for defining the intersection minimum depth value to be the greater of the tile depth value 324 and the primitive depth value 322 and the maximum depth value 332 with the lesser of the primitive maximum depth value 320 and the tile maximum depth value 326.

Figure 6:
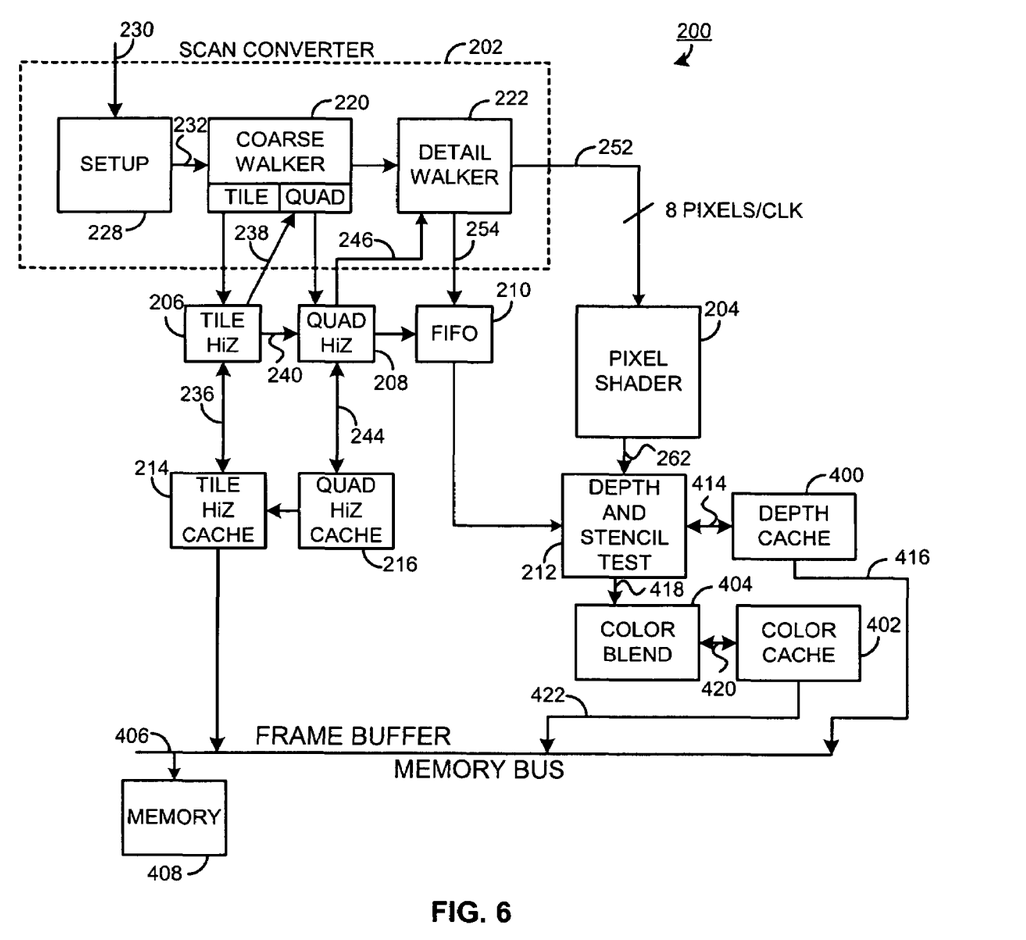
FIG. 6 illustrates a graphical representation of a graphics processing system in accordance with one embodiment of the present invention.

FIG. 6 illustrates another representation of an embodiment of the apparatus for generating hierarchical depth culling characteristics 200. The apparatus 200 includes the scan converter 202 that receives the pixel information 230 into the setup engine 218, processes information through the coarse walker 220 and provides an output 252 generated by the detail walker 222. Also using the tile hierarchical Z engine 206 and the quad hierarchical Z engine 208, the FIFO 210 is able to provide the output signal 260 to the depth and stencil test 212. The depth and stencil test 212 also receives the pixel shader output 262. Thereupon, using depth information from the depth cache 400, the depth and stencil test 212 may perform the depth and stencil test for determining the approximate visibility of the pixels provided from the pixel shader 204 or from the FIFO 210.

The apparatus 200 also includes a color cache 402 and a color blend module 404, wherein the color cache is coupled to the frame buffer memory bus 406. The frame buffer memory bus is further coupled to a memory 410, which may be any suitable type of memory device.

The depth and stencil test 212 receives depth information 414 from the depth cache 400. Moreover, the depth cache 400 provides depth information 416 to the frame buffer memory bus 406.

Based on the determination within the depth and stencil test 212, if the pixels pass the depth and stencil test, pixels 418 are provided to the color blend 404 which thereupon allows for blending of color information based on color information 420 from the color cache 402. As such, color pixel information 422 may be provided to the frame buffer memory bus 406 such that it may be provided to the memory 408. The system 200 further includes the tile hierarchical Z cache 214 coupled to the frame buffer memory bus 416 such that hierarchical Z cache information may be provided to the memory 408.

Figure 7:
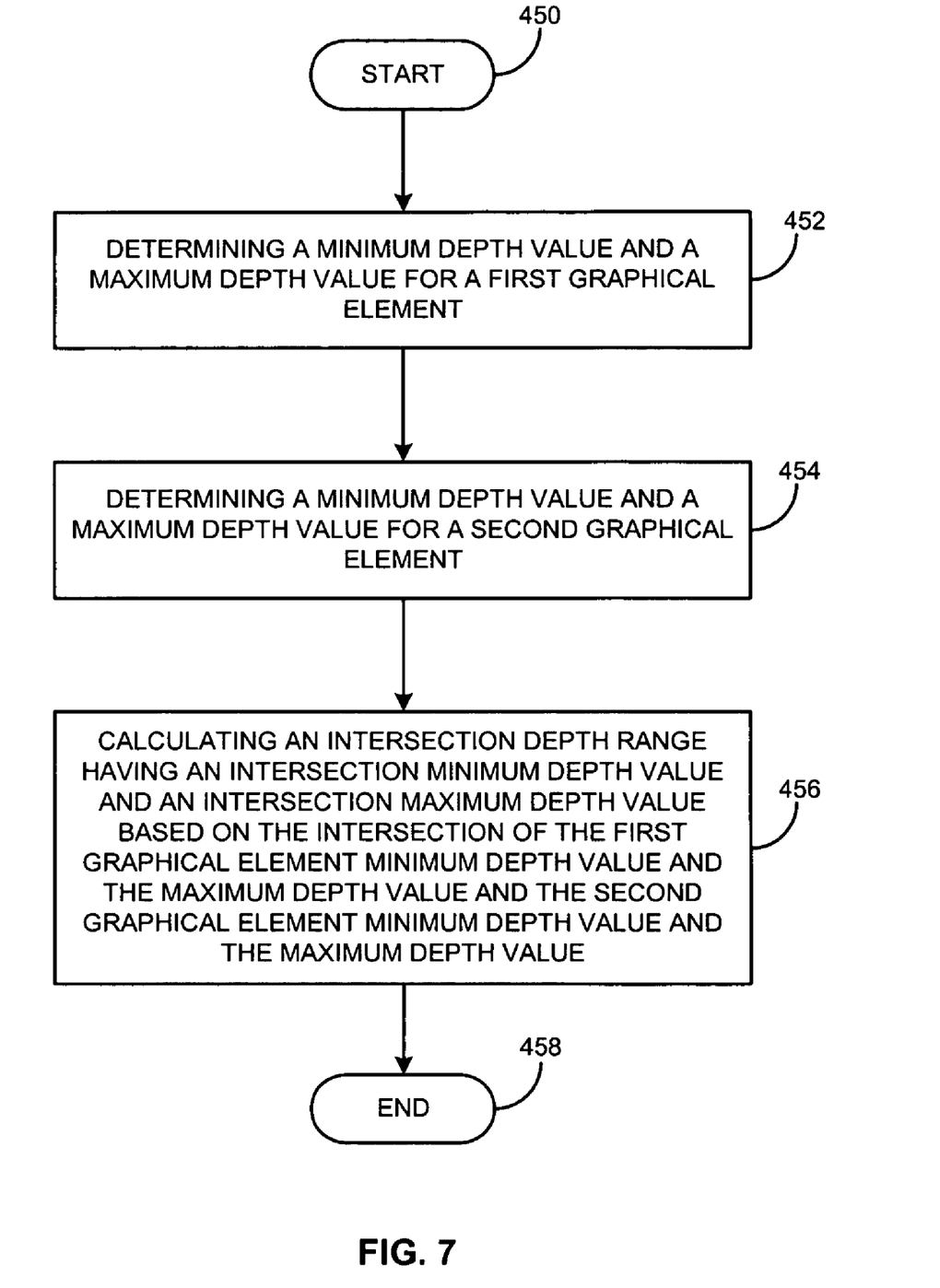
FIG. 7 illustrates a method for generating hierarchical depth culling characteristics in accordance with one embodiment of the present invention.

FIG. 7 illustrates a flowchart representing the steps of the method for generating hierarchical depth culling characteristics in accordance with one embodiment of the present invention. The method begins, step 450, by determining a minimum depth value and a maximum depth value of a first graphical element, step 452. As described above, the first graphical element may be a primitive, such as a tile or other polygon having a plurality of vertices and a plurality of pixels disposed therein. The next step, step 454, is determining a minimum depth value and a maximum depth value for a second graphical element. As discussed above, the second graphical element may be a tile including a matrix array of pixels disposed therein.

Thereupon, the next step, step 456, is calculating an intersection depth range having an intersection minimum depth value and an intersection maximum depth value based on the intersection of the first graphical element minimum depth value and the maximum depth value and the second graphical element minimum depth value and the maximum depth value. Thereupon, the method is complete, step 458.

The present invention provides for generating hierarchical depth culling characteristics that allow each tile to store both a minimum Z value and a maximum Z value, which together specify a bound on the range of Z values that exist within a particular tile. With the minimum Z value and maximum Z value, the present invention allows the performance of hierarchical tests for all depth comparisons, such as greater than, less than, equal, not equal to. Moreover, the Z range for the pixels being rendered are computed as the intersection of two different Z ranges, wherein the range of the Z values represented by the vertices of the triangle are of the primitives being rendered from the range of the Z values that can exist within the tile based on the Z gradient and the Z value within the tile. For large triangles, the tile's Z range may be more effective and for small triangles, the Z range of the tile may be more effective. Therefore, using both ranges allows the present invention to work well for a much larger set of applications.

The present invention further allows for minimum Z values and maximum Z values for a tile to be stored in a compressed form. In one embodiment, twenty bits store both values together, with fourteen bit accuracy for both of the tiles covers a relatively small range. When the tile covers a larger depth range, the accuracy of minimum Z values and maximum Z values may be less. In one embodiment, a processing routine may be utilized wherein a smaller bit representation, using a delta value, may represent a larger bit value.

The present invention also takes into account stencil values, wherein each tile stores three bits which can indicate whether there are any stencil values in the tile that are less than or greater than or equal to a specified comparison value. Thereupon, this improves the culling by identifying some cases where a pixel will be culled due to failing the stencil test. The present invention allows for identification of pixels that are guaranteed to pass the depth/stencil test as well as pixels that are guaranteed to fail. Therefore, the depth test logic may therefore be bypassed. For multi-sample pixels, depth testing a single pixel can require up to eight individual depth tests, therefore when a large fraction of pixels can be proven to either pass or fail the depth test, fewer depth comparators are required and thereby reducing the number of processing requirements for depth test logic.

The present invention further automatically updates the Z range and stencil compare bits as depth and stencil tests are performed such that subsequent operations of the same pixels have more accurate information about the depth and stencil values in the tile. This information may be written out to the memory, such as memory 408 of FIG. 6, after the corresponding depth/stencil data is flushed from the depth cache, such as depth cache 400 of FIG. 6. Moreover, the present invention allows for two-level hierarchical tests. After testing a tile that contains a matrix array of pixels in a typical embodiment, it then tests a sub-matrix group of pixels, quads. The Z range and stencil compare bits for the quads are now stored in the frame buffer as the tile Z range and stencil compare bits are. Instead they initialize from the tile Z range and then are updated when the tiles depth data is loaded into the depth cache. When the pixel shader bottlenecks computations, hierarchical tests may tend to back up until after the depth data is loaded into the cache. As a result, hierarchical tests have more accurate range information when there is the most need to cull pixels before the pixel shader.

It should be understood that the implementation of other variations and modifications of the invention in its various aspects will be apparent to those of ordinary skill in the art, and that the invention is not limited by the specific embodiments described herein. For example, the number of pixels in a pixel array may be any suitable number of pixels and the corresponding number of test pixels in a test pixel array may be any suitable number suitable for processing the tile of pixels. It is therefore contemplated and covered by the present invention, any and all modifications, variations or equivalents that fall within the spirit and scope of the basic underlying principles disclosed and claimed herein.

What is claimed is:

1. A method for generating hierarchical depth culling characteristics comprising:
   determining a first minimum depth value and a first maximum depth value for a first graphical element;
   determining a second minimum depth value and a second maximum depth value for a second graphical element;
   calculating an intersection depth range having an intersection minimum depth value and an intersection maximum depth value based on the intersection of the first minimum depth value and the first maximum depth value and the second minimum depth value and the second maximum depth value; and
   wherein the second graphical element includes a plurality of stencil indicators such that the stencil indicators indicate the spatial relationship of a stencil value to a comparison value, the method further comprising:
      identifying which pixels of a plurality of pixels are to be culled based on the spatial relationship of the pixel relative to the stencil value.

2. The method of claim 1 wherein the intersection minimum depth value is the greater of the first graphical element minimum depth value and the second graphical element minimum depth value and the intersection maximum depth value is lesser of the first graphical element maximum depth value and the second graphical element maximum depth value.

3. The method of claim 1 wherein the first graphical element is a primitive and the graphical element is a tile.

4. The method of claim 1 further comprising:
   performing hierarchical tests for a plurality of depth comparisons with regards to the second graphical element.

5. The method of claim 1 wherein the second graphical element includes the second minimum depth value and the second maximum depth value.

6. The method of claim 5 wherein the second minimum depth value and the second maximum depth value are stored in a compressed format.

7. The method of claim 1 further comprising:
   identifying which pixels of the plurality pixels will pass a depth/stencil test; and identifying which pixels of the plurality of pixels will fail the depth stencil test.

8. The method of claim 7 further comprising:
   updating a depth range and stencil compare bit in response to the steps of identifying which pixels of the plurality of pixels will pass the depth/stencil test and identifying which pixels of the plurality of pixels will fail the depth stencil test.

9. The method of claim 8 further comprising:
   performing a two level hierarchical test using a group of pixels.

10. A method for generating hierarchical depth culling characteristics comprising:
    determining a vertex minimum depth value and a vertex maximum depth value for a primitive;
    determining a tile minimum depth value and a tile maximum depth value for a tile having a plurality of pixels therein;
    calculating an intersection depth range having an intersection minimum depth value and an intersection maximum depth value based on the intersection of the vertex minimum depth value and the vertex maximum depth value and the tile minimum depth value and the tile maximum depth value, wherein the intersection minimum depth value is the greater of the vertex minimum depth value and the tile minimum depth value and the intersection maximum depth value is lesser of the vertex maximum depth value and the tile maximum depth value;
    wherein the tile includes a plurality of stencil indicators such that the stencil indicators indicate the spatial relationship of a stencil value to a comparison value, the method further comprising:
    identifying which pixels of the plurality of pixels in the tile are to be culled based on the spatial relationship of the pixel relative to the stencil value including:
       identifying which pixels of the plurality of pixels will pass a depth/stencil test; and
       identifying which pixels of the plurality of pixels will fail the depth stencil test.

11. The method of claim 10 further comprising:
    performing hierarchical tests for a plurality of depth comparisons for the plurality of pixels within the tile.

12. The method of claim 10 wherein the tile includes the tile minimum depth value and the tile maximum depth value stored therein in a compressed format.

13. The method of claim 10 further comprising:
    updating a depth range and stencil compare bit in response to the steps of identifying which pixels of the plurality of pixels will pass the depth/stencil test and identifying which pixels of the plurality of pixels will fail the depth stencil test.

14. The method of claim 13 farther comprising:
performing a two level hierarchical test on the tile in a sequential format, testing a predetermined number of pixels at a time and repeating the test for all the pixels within the tile.

15. An apparatus for generating hierarchical depth culling characteristics, the apparatus comprising:
a scan converter including;
a setup engine operably couple to receive a plurality of pixels and generate a plurality of primitives having vertices therefrom,
a coarse walker coupled to the setup engine, wherein the coarse walker generates a tile that includes a plurality of the pixels; and
a detail walker coupled to the coarse walker for generating a tile output;
a tile hierarchical z processing engine coupled to the coarse walker such that a hierarchical z test may be performed on the tile;
a quad hierarchical z processing engine operably coupled to the coarse walker, coupled to receive a group of pixels such that a depth test may be performed on the group of pixels and the group of pixels provided to the detail walker;
a pixel shader operably coupled to receive a plurality of scan converted pixels of the plurality of pixels from the detail walker; and
a depth and stencil processing engine coupled to the pixel shader such that the depth and stencil processing engine performs a depth and stencil test on a plurality of shaded pixels from the pixel shader such that upon the depth and stencil test, the depth and stencil processing engine provides update depth and stencil data to a quad hierarchical z cache and a tile hierarchical z cache.

16. The method of claim 15 further comprising:
a memory device coupled to the scan converter and the quad hierarchical z engine such that the memory device provides depth information to the depth and stencil test engine.

17. The apparatus of claim 16 further comprising:
a depth cache operably coupled to the depth and stencil test engine, the depth cache storing an updated plurality of z range values and an updated plurality of stencil compare bits therein.

18. The apparatus of claim 16 wherein the quad hierarchical z cache and the tile hierarchical z cache receive updated z range values and updated stencil compare bits such that these updated z range values and stencil compare bits may be utilized by the quad hierarchical z engine to determine which quads are to be passed and which quads are to be culled.

19. The apparatus of claim 16 further comprising:
frame buffer operably coupled to the tile hierarchical z cache such that a plurality of tile z range values and tile stencil compares bit may be retrieved therefrom.

20. The method of claim 1 wherein the first graphical element is a primitive and the graphical element is a tile and wherein the method further comprises performing hierarchical tests for a plurality of depth comparisons with regards to the second graphical element.

\* \* \* \* \*